United States Patent [19]

Yeh et al.

[11] Patent Number: 5,196,953
[45] Date of Patent: Mar. 23, 1993

[54] COMPENSATOR FOR LIQUID CRYSTAL DISPLAY, HAVING TWO TYPES OF LAYERS WITH DIFFERENT REFRACTIVE INDICES ALTERNATING

[75] Inventors: Pochi A. Yeh, Thousand Oaks; William J. Gunning, Newbury Park; John P. Eblen, Jr., Newbury Park; Mohsen Khoshnevisan, Newbury Park, all of Calif.

[73] Assignee: Rockwell International Corporation, Seal Beach, Calif.

[21] Appl. No.: 786,621

[22] Filed: Nov. 1, 1991

[51] Int. Cl.$^5$ .................... G02F 1/1335; G02F 1/137
[52] U.S. Cl. ........................................ 359/73; 359/94
[58] Field of Search ................................. 359/73, 94

[56] References Cited

U.S. PATENT DOCUMENTS

| | | | |
|---|---|---|---|
| 4,385,806 | 5/1983 | Fergason | 350/347 R |
| 4,505,546 | 3/1985 | Umeda et al. | 350/334 |
| 4,701,028 | 10/1987 | Clerc et al. | 359/73 |
| 4,759,612 | 7/1988 | Nakatsuka et al. | 350/337 |
| 4,844,569 | 7/1989 | Wada et al. | 350/347 R |
| 4,889,412 | 12/1989 | Clerc et al. | 359/73 |
| 4,904,058 | 2/1990 | Kato et al. | 350/335 |
| 4,909,606 | 3/1990 | Wada et al. | 350/347 R |
| 4,936,654 | 6/1990 | Suzaki et al. | 350/337 |
| 4,973,137 | 11/1990 | Kozaki | 350/339 |
| 4,984,872 | 1/1991 | Vick | 350/321 |
| 4,995,704 | 2/1991 | Yamamoto et al. | 350/334 |
| 5,016,988 | 5/1991 | Iimura | 350/339 R |
| 5,032,008 | 7/1991 | Yamamoto et al. | 350/347 |
| 5,124,824 | 6/1992 | Kozaki et al. | 359/73 |

FOREIGN PATENT DOCUMENTS

| | | | |
|---|---|---|---|
| 0412844 | 2/1991 | European Pat. Off. | 359/73 |
| 3-263013 | 11/1991 | Japan | 359/73 |

OTHER PUBLICATIONS

Gooch, et al., "The Optical Properties of Twisted Nematic Liquid Crystal Structures with Twist Angles $\leq 90°$", Journal of Physics D, vol. 8, p. 1575 (1975).

Grinberg, et al., "Transmission Characteristics of a Twisted Nematic Liquid—Crystal Layer", Journal of the Optical Society of America, vol. 66, p. 1003 (Oct. 1976).

Kahn, "The Molecular Physics of Liquid-Crystal Devices", Physics Today, p. 68 (May 1982).

Penz, "Viewing Characteristics of the Twisted Nematic Display", Proceeding of the S.I.D, vol. 19, No. 2, p. 43 (1978).

Primary Examiner—William L. Sikes
Assistant Examiner—Anita Pellman Gross
Attorney, Agent, or Firm—John J. Deinken

[57] ABSTRACT

A liquid crystal display includes a polarizer layer, an analyzer layer, a liquid crystal layer disposed between the polarizer layer and the analyzer layer, a first electrode proximate to a first major surface of the liquid crystal layer, and a second electrode proximate to a second major surface of the liquid crystal layer. The first and second electrodes are adapted to apply a voltage across the liquid crystal layer when the electrodes are connected to a source of electrical potential. A multilayer thin film compensator is disposed between the polarizer layer and the analyzer layer, the multilayer compensator including a first plurality of layers, each having a first refractive index and a first thickness, alternating with a second plurality of layers, each having a second refractive index and a second thickness. The values of the first and second refractive indices and thicknesses are such that the phase retardation of the multilayer is equal in magnitude but opposite in sign to the phase retardation of the liquid crystal layer in its homeotropically aligned state over a predetermined range of viewing angles.

12 Claims, 5 Drawing Sheets

COMPENSATOR FOR LIQUID CRYSTAL DISPLAY, HAVING TWO TYPES OF LAYERS WITH DIFFERENT REFRACTIVE INDICES ALTERNATING

BACKGROUND OF THE INVENTION

This invention is concerned with the design of liquid crystal displays and particularly with techniques for maximizing the field of view of such displays.

Liquid crystals are useful for electronic displays because light travelling through a thin film of liquid crystal is affected by the birefringence of the film, which can be controlled by the application of a voltage across the film. Liquid crystal displays became desirable because the transmission or reflection of light from an external source, including ambient light, could be controlled with much less power than was required for the luminescent materials used in other displays. Liquid crystal displays now commonly used in such applications as digital watches, calculators, portable computers, and many other types of electronic equipment exhibit the advantages of very long life and operation with very low voltage and low power consumption.

The information in many liquid crystal displays is presented in the form of a row of numerals or characters, which are generated by a number of segmented electrodes arranged in a pattern. The segments are connected by individual leads to driving electronics, which applies a voltage to the appropriate combination of segments to display the desired information by controlling the light transmitted through the segments. Graphic information or television displays may be achieved by a matrix of pixels which are connected by an X-Y sequential addressing scheme between two sets of perpendicular conductors. More advanced addressing schemes use arrays of thin film transistors to control the drive voltage at the individual pixels. This scheme is applied predominantly to twisted nematic liquid crystal displays, but is also finding use in high performance versions of super twist liquid crystal displays.

Contrast is one of the most important attributes determining the quality of a liquid crystal display. The primary factor limiting the contrast achievable in a liquid crystal display is the amount of light which leaks through the display in the dark state. This problem is exacerbated in a bright environment, such as sunlight, where there is a considerable amount of reflected and scattered ambient light. In addition, the legibility of the image generated by a liquid crystal device depends on the viewing angle, especially in a matrix addressed device with a large number of scanning electrodes. Image contrast in a typical liquid crystal display is a maximum only within a narrow viewing angle centered about normal incidence and drops off as the angle of view is increased. This loss of contrast is caused by light leaking through the black state pixel elements at large viewing angles. In color liquid crystal displays, the leakage also causes severe color shifts for both saturated and gray scale colors. These limitations are particularly important for avionics applications, where copilot viewing of the pilot's displays is important. It would be a significant improvement in the art to provide a liquid crystal display capable of presenting a high quality, high contrast image over a wide field of view.

SUMMARY OF THE INVENTION

By providing a specially designed multilayer thin film to be incorporated into a liquid crystal display and compensate for the phase retardation inherent in such a display, this invention makes possible a striking improvement in the viewing contrast and color rendition of such displays at oblique viewing angles.

A liquid crystal display fabricated according to this invention includes a polarizer layer, an analyzer layer, a liquid crystal layer disposed between the polarizer layer and the analyzer layer, a first electrode proximate to a first major surface of the liquid crystal layer, and a second electrode proximate to a second major surface of the liquid crystal layer. The first and second electrodes are adapted to apply a voltage across the liquid crystal layer when the electrodes are connected to a source of electrical potential. A multilayer thin film compensator is disposed between the polarizer layer and the analyzer layer, the multilayer compensator including a first plurality of layers, each having a first refractive index and a first thickness, alternating with a second plurality of layers, each having a second refractive index and a second thickness. The values of the first and second refractive indices and thicknesses are such that the phase retardation of the multilayer is equal in magnitude but opposite in sign to the phase retardation of the liquid crystal layer in its homeotropically aligned state over a predetermined range of viewing angles.

In a more particular embodiment, the liquid crystal layer has thickness $d_L$ and a birefringence $\Delta n_L$, the multilayer compensator has a thickness $d_C$ and a birefringence $\Delta n_C$, and $|\Delta n_L| d_L = |\Delta n_C| d_C$. In an embodiment designed to provide optimum compensation over a wide range of viewing angles, the liquid crystal layer has an ordinary index of refraction $n_{oL}$ and an extraordinary index of refraction $n_{eL}$, the multilayer has an ordinary index of refraction $n_{oC}$ and an extraordinary index of refraction $n_{eC}$, $n_{eC}=n_{oL}$, $n_{oC}=n_{eL}$, and $d_L=d_C$. Furthermore, the equivalent refractive indices of the multilayer may satisfy the equations:

$$n_o^2 = \frac{d_1}{\Lambda} n_1^2 + \frac{d_2}{\Lambda} n_2^2$$

$$\frac{1}{n_e^2} = \frac{d_1}{\Lambda} \frac{1}{n_1^2} + \frac{d_2}{\Lambda} \frac{1}{n_2^2}$$

where $n_o$ is the equivalent ordinary refractive index of the multilayer, $n_e$ is the equivalent extraordinary refractive index of the multilayer, $n_1$ is the first refractive index, $n_2$ is the second refractive index, $d_1$ is the first thickness, $d_2$ is the second thickness, and $\Lambda = d_1 + d_2$ is the period of the multilayer.

DESCRIPTION OF THE INVENTION

Figure 1:
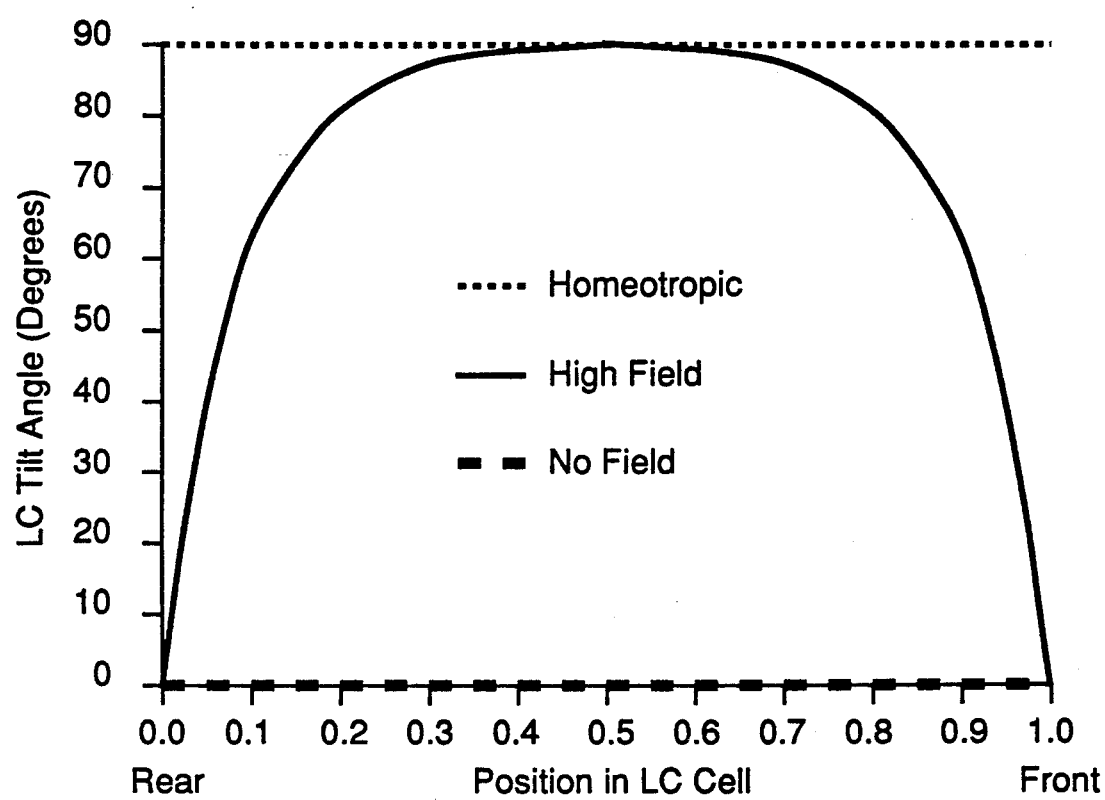
FIG. 1 is a plot of the tilt angle of a liquid crystal molecule as a function of position in a liquid crystal cell for various conditions.

Several types of liquid crystal cells are in widespread use in flat panel displays. Active matrix addressing allows such displays to present a full color image with high resolution at reasonable refresh rates. When viewed directly a liquid crystal display provides high quality output, but the image degrades and exhibits poor contrast at large viewing angles. This occurs because liquid crystal cells operate by virtue of the birefringent effect exhibited by a liquid crystal medium which includes a large number of anisotropic liquid crystal molecules. Such a material will be positively uniaxially birefringent ($n_e > n_o$, i.e., the extraordinary refractive index $n_e$ is larger than the ordinary refractive index $n_o$) with an extraordinary refractive index associated with the alignment of the long molecular axes. The phase retardation effect such a material has on light passing through it inherently varies with the inclination angle of the light, leading to a lower quality image at large viewing angles (See, e.g., Penz, Viewing Characteristics of the Twisted Nematic Display, Proceeding of the S.I.D, Volume 19, Page 43 (1978); Grinberg, et al., Transmission Characteristics of a Twisted Nematic Liquid-Crystal Layer, Journal of the Optical Society of America, Volume 66, Page 1003 (1976)). By introducing an optical compensating element in conjunction with the liquid crystal cell, however, it is possible to correct for the unwanted angular effects and thereby maintain higher contrast at larger viewing angles than otherwise possible.

The type of optical compensation required depends upon the type of display, normally black or normally white, which is used. In a normally black display, the twisted nematic cell is placed between polarizers whose transmission axes are parallel to one another and to the orientation of the director of the liquid crystal at the rear of the cell (i.e., the side of the cell away from the viewer). In the unenergized state (no applied voltage), normally incident light from the backlight is polarized by the first polarizer and in passing through the cell has its polarization direction rotated by the twist angle of the cell. This is caused by adiabatic following, which is also known as the waveguiding effect. The twist angle is set to 90° so that the light is blocked by the output polarizer. When a voltage is applied across the cell, the liquid crystal molecules are forced to more nearly align with the electric field, eliminating the twisted nematic symmetry. In this orientation, the optical (c-axis) of the cell is perpendicular to the cell walls. The liquid crystal layer then appears isotropic to normally incident light, eliminating the waveguiding effect so that the polarization state is unchanged by propagation through the liquid crystal layer and such light can pass through the output polarizer. Patterns can be written in the display by selectively applying a voltage to the portions of the display which are to appear illuminated.

When viewed at large angles, however, the dark (unenergized) areas of a normally black display will appear light because of angle-dependent retardation effects for light passing through the liquid crystal layer at such angles, i.e., off-normal incidence light senses an angle-dependent change of polarization. Contrast can be restored by using a compensating element which has an optical symmetry similar to that of the twist cell but which reverses its effect. One method is to follow the active liquid crystal layer with a twist cell of reverse helicity. Another is to use one or more A-plate retarder compensators. These compensation methods work because the compensation element shares an optical symmetry with the twisted nematic cell; both are uniaxial birefringent materials having an extraordinary axis orthogonal to the normal light propagation direction. These approaches to compensation have been widely utilized because of the ready availability of materials with the required optical symmetry. Reverse twist cells employ liquid crystals and A-plate retarders are readily manufactured by the stretching of polymers such as polyvinyl alcohol (PVA).

Despite the effectiveness of these compensation techniques, there are drawbacks to this approach associated with the normally black operational mode. The appearance of a normally black display is very sensitive to cell gap. Consequently, in order to maintain a uniform dark appearance it is necessary to make the liquid crystal cell very thick, which results in unacceptably long liquid crystal response times, or to operate at a Gooch-Tarry minimum (See Gooch, et al., The optical Properties of Twisted Nematic Liquid Crystal Structures with Twist Angles $\leq 90°$, Journal of Physics D, Volume 8, Page 1575 (1975)). This approach, however, imposes manufacturing tolerances on the liquid crystal cell gap which are difficult to achieve. In addition, the reverse twist compensation technique requires the insertion of a second liquid crystal cell into the optical train, adding significant cost, weight, and bulk to the display. For these reasons, it is highly desirable to compensate a normally white display in order to avoid these disadvantages.

In the normally white display configuration, the 90° twisted nematic cell is placed between polarizers which are crossed, such that the transmission axis of each polarizer is parallel to the director orientation of the liquid crystal molecules in the region of the cell adjacent to it. This reverses the sense of light and dark from that of the normally black display. The unenergized (no applied voltage) areas appear light in a normally white display, while those which are energized appear dark. The problem of ostensibly dark areas appearing light when viewed at large angles still occurs, but the reason for it is different and its correction requires a different type of optical compensating element. In the energized areas the liquid crystal molecules tend to align with the applied electric field. If this alignment were perfect, all the liquid crystal molecules in the cell would have their long axes normal to the substrate glass. This arrangement, known as the homeotropic configuration, exhibits the optical symmetry of a positively birefringent C-plate. In the energized state the normally white display appears isotropic to normally incident light, which is blocked by the crossed polarizers.

The loss of contrast with viewing angle occurs because the homeotropic liquid crystal layer does not appear isotropic to off normal light. Light directed at off normal angles propagates in two modes due to the birefringence of the layer, with a phase delay between those modes which increases with the incident angle of the light. This phase dependence on incidence angle introduces an ellipticity to the polarization state which is then incompletely extinguished by the second polarizer, giving rise to light leakage. Because of the C-plate symmetry, the birefringence has no azimuthal dependence. Clearly what is needed is an optical compensating element, also in C-plate symmetry, but with negative ($n_e < n_o$) birefringence. Such a compensator would introduce a phase delay opposite in sign to that caused by the liquid crystal layer, thereby restoring the original polarization state, allowing the light to be blocked by the output polarizer.

This technique has not been used in the past because it has been difficult or impossible to construct a C-plate compensator with the required optical symmetry. There has been no way found to stretch or compress polymers to obtain large area films with negative C-plate optical symmetry and the required uniformity, nor is it possible to form a compensator from a negatively birefringent crystal such as sapphire. In order for such a compensator to be effective, the phase retardation of such a plate would have to have the same magnitude as the phase retardation of the liquid crystal and would also have to change with viewing angle at the same rate as the change of the liquid crystal's phase retardation. These constraints imply that the thickness of the negative plate would thus be on the order of 10 μm, making such an approach very difficult to accomplish because it would require the polishing of an extremely thin plate having the correct (negative) birefringence while ensuring that the surfaces of the plate remained parallel. Since such displays are relatively large in size, the availability of a negatively birefringent crystal of sufficient size would also be a major difficulty. Compensation techniques have been proposed which utilize crossed A-plate compensators. Such an arrangement, however, cannot produce a compensator with azimuthal (C-plate) symmetry. Because of these difficulties, the tendency in the art has been to rely on normally black displays, even though the normally white type could produce a superior quality display if an appropriate compensator were available. The present invention provides, for the first time, a practical solution to the need for such a compensator.

In practice, perfect homeotropic alignment of the liquid crystal molecules in a display cell is not achieved even when high voltages are applied. This is because the method of attachment of the liquid crystal molecules to the substrate glass prevents those molecules adjacent to the glass from tilting to align with the field. The molecules positioned away from the substrates, however, are essentially aligned with the applied field, so that the overall optical symmetry of the liquid crystal layer can be characterized as essentially that of a positively birefringent C-plate. FIG. 1 is a plot of tilt angle as a function of position in a twisted nematic liquid crystal cell, illustrating a typical distribution of molecular tilt angles throughout the liquid crystal layer under no applied field (represented by the heavy dashed line), high field (represented by the solid line) and ideal homeotropic (represented by the short dashed line) conditions. The tilt angle is the angle between the long molecular axis (director) and the plane of the substrate glass. Note that a large fraction of the molecules are nearly homeotropically aligned in the high field condition.

Figure 2:
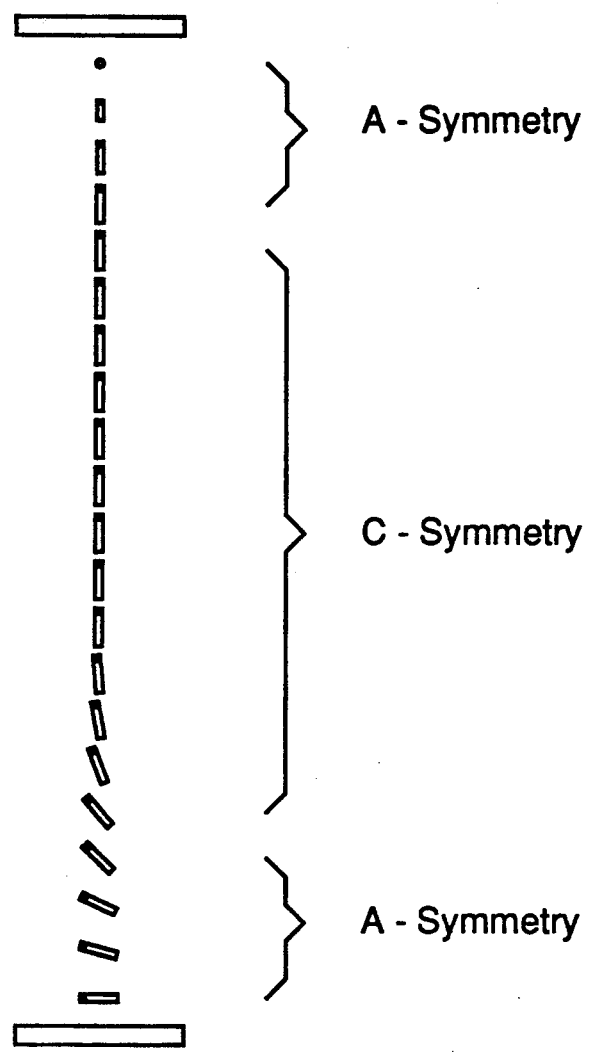
FIG. 2 is a schematic diagram illustrating the liquid crystal director orientations across a liquid crystal cell gap with a strong field applied.

FIG. 2 is a schematic of the liquid crystal director orientations across the cell gap with a strong field applied. The continuous variation can be analytically divided into three liquid crystal regions, each characterized by its own optical symmetry. Adjacent to each substrate glass is a region whose symmetry is that of an A-plate with its extraordinary axis aligned with the substrate rub direction. Between them is the larger region which exhibits positive C-plate symmetry. The negative C-plate compensator is designed to correct for the angle dependent phase shift introduced by propagation through this region. It is effective to the extent that the optical symmetry of this region dominates the selected state of the liquid crystal cell, that is, the extent to which the molecules align with the applied field. This implies that it will work when strong fields are used for the select state as this makes the homeotropic approximation more nearly correct.

Uncompensated full color liquid crystal displays typically exhibit a large variation in chromaticity over the field of view. Consequently, an area which appears one color when viewed at normal incidence may appear less saturated or may even appear as its complementary color when viewed at large angles. This results from the same physical mechanism which causes diminished contrast at large angles, i.e., unwanted light leakage through the ostensibly dark areas.

A full color display is achieved by placing red, blue, and green transmissive filters on a display's pixels. In the normally white type of color display, a red area is presented by selecting (applying voltage to) the blue and green pixels in that area to make them nontransmissive, while leaving the red pixels nonselected. This scheme functions adequately when viewed directly, but at large angles the blue and green pixels begin to transmit, thereby causing the red to appear washed out. This effect is suppressed in the normally white display by a C-plate compensator. Desaturation is eliminated by suppressing dark state leakage.

Figure 3:
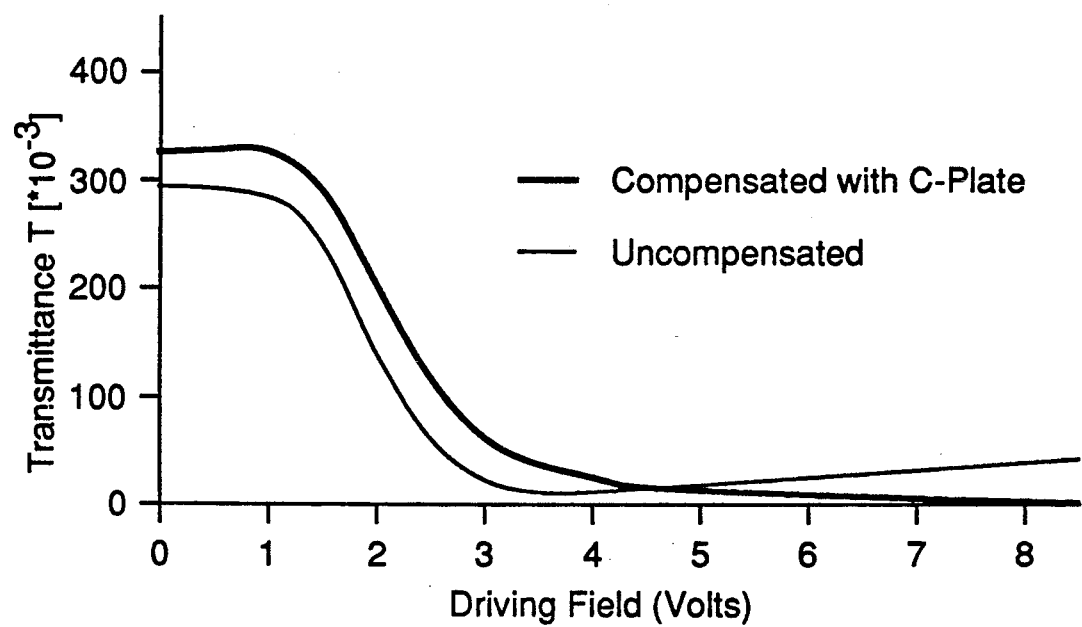
FIG. 3 is a graphical plot showing the transmission of light versus applied voltage for a typical normally white twisted nematic cell viewed at a large angle.

FIG. 3 is a graphical plot showing transmission of light versus applied voltage for a typical normally white twisted nematic cell viewed at a large angle. This example depicts data obtained for a viewing angle of 40° off normal in the horizontal plane and 8° off of normal incidence in the vertical plane. The transmission curves are shown for both uncompensated (solid line) and C-plate compensated (dashed line) displays. In the compensated display, the transmission decreases monotonically with voltage, whereas in the uncompensated display the trend reverses so that the transmission at high voltage can exceed that at intermediate voltages. This is particularly troublesome when the display is operated in gray scale mode, which is a technique for displaying low luminance levels by using intermediate voltages to drive the bright areas. When the voltage is chosen to make those bright areas have very low luminance, the transmission of the nominally dark pixels can exceed that of the bright pixels. In this uncompensated situation, instead of simply washing out, gray scale colors take on the complementary color. For instance, areas which are dim red at normal incidence would appear cyan when viewed from an angle. By eliminating this trend reversal in the transmission curve, C-plate compensation suppresses this color reversal in normally white displays.

It is an outstanding feature of the present invention to achieve the requisite compensation by using layered media, which consist of alternating thin films of materials with different indices of refraction. Such a layered structure can operate as an artifically birefringent thin plate. A multilayer compensator fabricated in this manner can be made to exhibit negative birefringence; moreover, the desired birefringence of the multilayer structure can be tailored precisely by choosing proper layer thicknesses and materials. This thin film structure provides a powerful technique for effectively compensating the undesirable phase retardation of the homeotropically aligned state in a liquid crystal display.

Turning now to the optical foundation for this invention, consider that, at an illustrative off-normal viewing angle of 60°, the positive birefringence of a liquid crystal material leads to a phase retardation $\Gamma$ of approximately:

$$\Gamma = \frac{2\pi}{\lambda}(n_{eL} - n_{oL})d_L \quad \quad 1)$$

where $n_{eL}$ and $n_{oL}$ are the refractive indices of the homeotropically aligned liquid crystal, $d_L$ is the thickness of the liquid crystal cell, and $\lambda$ is the wavelength of the transmitted light (note that $n_{eL}$ varies as a function of viewing angle). Given a hypothetical liquid crystal of $d_L = 6$ μm and $n_{eL} - n_{oL} = 0.1$, for example, the phase retardation would equal $\pi$ for a wavelength $\lambda$ of 0.6 μm. Phase retardation values of this magnitude can cause a severe leakage of light from the liquid crystal at such oblique viewing angles.

A periodic stratified medium will exhibit birefringence with C-plate symmetry. For optical propagation, such a medium will behave like a homogeneous and uniaxially birefringent material. The equivalent refractive indices $n_o$ and $n_e$, derived for the case of wavelengths much larger than the layer thicknesses, are given for a two-material multilayer by:

$$n_o^2 = \frac{d_1}{\Lambda}n_1^2 + \frac{d_2}{\Lambda}n_2^2 \quad \quad 2)$$

$$\frac{1}{n_e^2} = \frac{d_1}{\Lambda}\frac{1}{n_1^2} + \frac{d_2}{\Lambda}\frac{1}{n_2^2} \quad \quad 3)$$

where $n_1$ and $n_2$ are the indices of refraction of the first and second layer materials, $d_1$ is the thickness of the layers of the first material, $d_2$ is the thickness of the layers of the second material, and $\Lambda = d_1 + d_2$ is the period of the multilayer (from Yeh, Optical Waves in Layered Media, Page 135 (Wiley 1988)). Note that equations 2) and 3) provide approximations which apply only to wavelengths away from the major reflection bands of the $\lambda/4$ structure for the transmitted light, since these expressions do not account for dispersion from the quarter wave band. It can be shown that the birefringence of such a periodic structure, with periods much smaller than a wavelength, is always negative (i.e., $n_o > n_e$). By choosing layer materials having the appropriate indices of refraction and thicknesses, both $n_o$ and $n_e$ for the composite multilayer can be precisely tailored.

When such a layered medium is added to a liquid crystal display device, the phase retardation introduced by the homeotropically aligned liquid crystal can be compensated. If $n_{oL}$ and $n_{eL}$ are the ordinary and extraordinary refractive indices of the homeotropically aligned liquid crystal, then for optimum compensation layer materials should be selected such that the product of the birefringence of the liquid crystal layer and its thickness is equal and opposite to the product of the birefringence of the multilayer compensator and its thickness. To provide the best compensation for the phase retardation at all angles, it is desirable to tailor the refractive indices of the C-compensator such that:

$$n_{eC} = n_{oL}$$

and $$n_{oC} = n_{eL} \quad \quad 4)$$

where $n_{eC}$ and $n_{oC}$ are the extraordinary and ordinary refractive indices for the compensator. In addition, for the most effective compensation over all viewing angles the thickness of the C-compensator should equal the thickness of the liquid crystal layer. Those skilled in the art will appreciate, however, that the equivalent length of the homeotropically aligned portion of the liquid crystal (i.e., the portion labelled C-symmetry in FIG. 2) must be determined empirically. Consequently, the optimum thickness of the C-compensator multilayer is best determined by experimentation for a given liquid crystal cell design.

Figure 4:
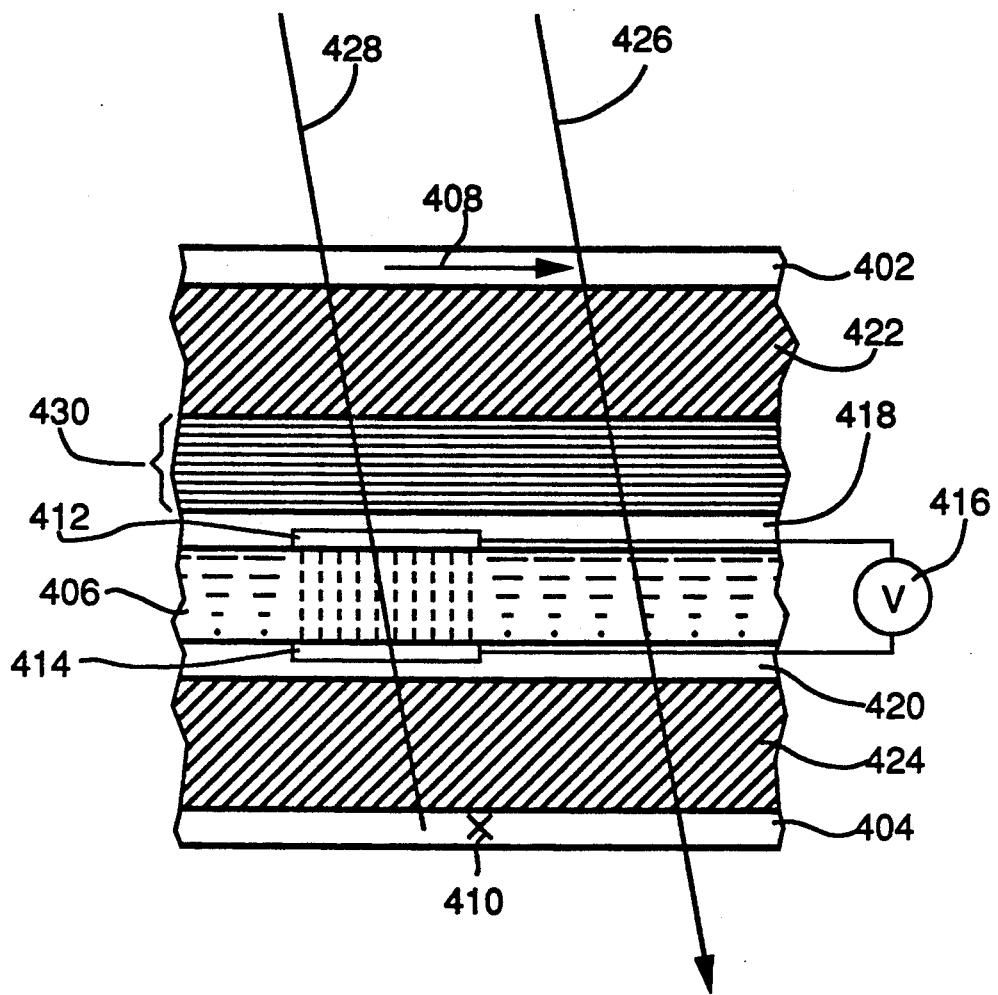
FIG. 4 is a cross sectional schematic side view of a twisted nematic, transmissive type liquid crystal display.

FIG. 4 is a cross sectional schematic side view of a twisted nematic, transmissive type normally white liquid crystal display (LCD) constructed according to this invention. The display includes a polarizer layer 402 and an analyzer layer 404, between which is positioned a liquid crystal layer 406, consisting of a liquid crystal material in the nematic phase. The polarizer and the analyzer, as is indicated by the symbols 408 (representing a polarization direction in the plane of the drawing) and 410 (representing a polarization direction orthogonal to the plane of the drawing), are oriented with their polarization directions at 90° to one another, as is the case for a normally white display. A first transparent electrode 412 and a second transparent electrode 414 are positioned adjacent to opposite surfaces of the liquid crystal layer so that a voltage can be applied, by means of a voltage source 416, across the liquid crystal layer. The liquid crystal layer is in addition sandwiched between a pair of glass plates 418 and 420. As is explained further below, the inner surfaces of the glass plates 418 and 420, which are proximate to the liquid crystal layer 406, are physically treated, as by buffing. Substrates 422 and 424 provide support structure for the aforementioned layers of the display.

As is well known in the LCD art (see, e.g., Kahn, The Molecular Physics of Liquid-Crystal Devices, Physics Today, Page 68 (May 1982)), when the material of the liquid crystal layer 406 is in the nematic phase and the inner surfaces of the plates 418 and 420 (the surfaces adjacent to the layer 406) are buffed and oriented with their buffed directions perpendicular, the director n of the liquid crystal material, absent any applied electrical voltage, will tend to align with the buffing direction in the regions of the layer proximate each of the plates 418 and 420. Furthermore, the director will twist smoothly through an angle of 90° along a path in the layer 406 from the first major surface adjacent to the plate 418 to the second major surface adjacent to the plate 420. Consequently, in the absence of an applied electric field the direction of polarization of incoming polarized light will be rotated by 90° in travelling through the liquid crystal layer. When the glass plates and the liquid crystal layer are placed between crossed polarizers, such as the polarizer 408 and the analyzer 410, light polarized by the polarizer 408 and traversing the display, as exemplified by the light ray 426, will thus be aligned with the polarization direction of the analyzer 410 and therefore will pass through the analyzer. When a sufficient voltage is applied to the electrodes 418 and 420, however, the applied electric field causes the director of the liquid crystal material to tend to align parallel to the field. With the liquid crystal material in this state, light passed by the polarizer 408, as illustrated by the light ray 428, will be extinguished by the analyzer 410. Thus an energized pair of electrodes will produce a dark region of the display, while light passing through regions of the display which are not subject to an applied field will produce illuminated regions. As is well known in the LCD display art, an appropriate pattern of electrodes, activated in selected combinations, can be utilized in this manner to display alphanumeric or graphic information.

Figure 5:
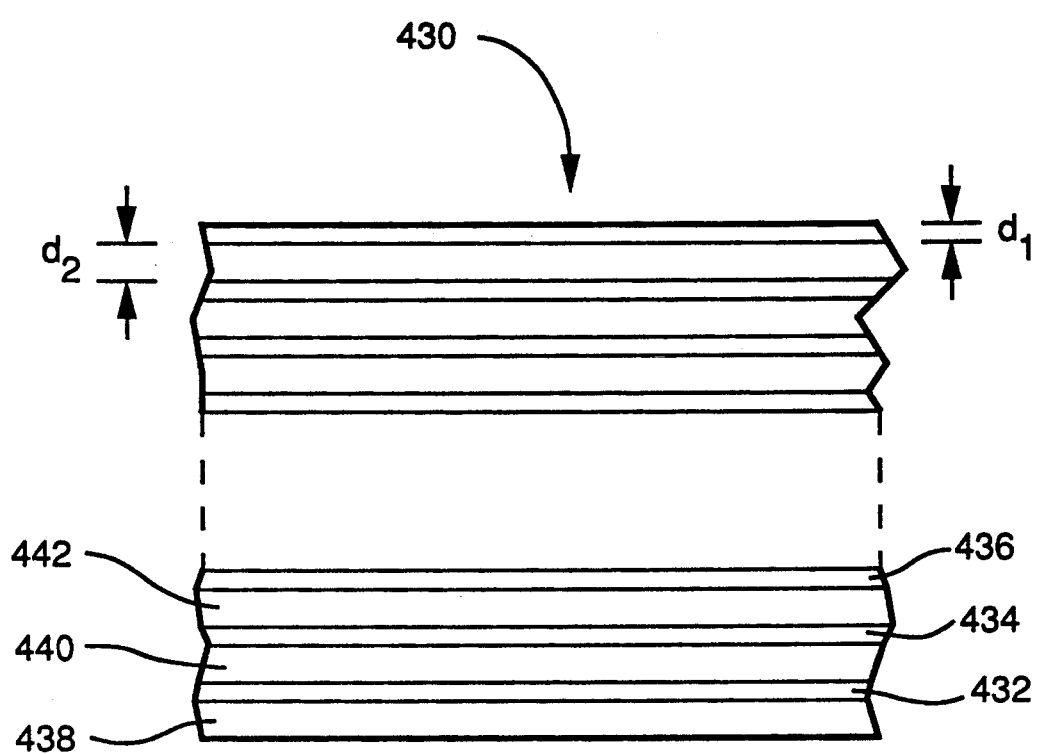
FIG. 5 is an enlarged view of the multilayer portion of the display depicted in FIG. 4.

It is an outstanding feature of this invention to provide a multilayer thin film compensator 430 positioned in the display between the polarizer layer and the analyzer layer to enhance the viewing properties of a liquid crystal display over a wide range of viewing angles. The compensator includes a first series of layers having a first refractive index which alternate with a second series of layers having a second refractive index. The values of the first and second refractive indices, as well as the thicknesses of the layers in the first and the second series, are chosen such that the phase retardation of the multilayer is equal in magnitude but opposite in sign to the phase retardation of the liquid crystal layer. An enlarged view of the multilayer 430 is depicted in a cross sectional side view in FIG. 5. This view shows a first series 432, 434, 436 . . . of layers having a first thickness $d_1$ and a second series 438, 440, 442 . . . of layers having a second thickness $d_2$. As those skilled in the art of optical thin films will appreciate, in order to effectively illustrate the concept of this invention the thicknesses of the layers are exaggerated relative to the dimensions of an actual multilayer and the number of layers depicted is lower than would typically be employed in an actual multilayer, as indicated by the dashed lines in the middle of the multilayer.

Although the preferred embodiment illustrated here includes a multilayer compensator having two series of alternating layers comprising a first and a second optical material, those skilled in the art will recognize that the concept of a multilayer compensator applies as well to more complex multilayers including periodic layer structures of three or more materials, as well as multilayers in which the different layers of a particular material vary in thickness. Furthermore, the inventive concept is applicable to reflective as well as transmissive type liquid crystal displays.

Another type of liquid crystal display which can benefit from this invention is the supertwist nematic cell, which exhibits voltage response characteristics allowing it to be addressed by simple multiplexing, thereby avoiding the expense and manufacturing difficulty associated with active matrix addressing. The supertwist configuration is achieved by doping the nematic liquid crystal material with a chiral additive which gives the cell 270° of total twist. Supertwist nematic cells are typically used in the normally black configuration, often employing the compensation techniques described above for normally black displays. Such cells, however, can also be operated in the normally white mode and such normally white supertwist displays would also benefit from the addition of the multilayer compensator of this invention for field of view enhancement. Moreover, the compensation scheme of this invention is broadly applicable to any liquid crystal display device which employs a homeotropically aligned state as part of its operation. Other types of liquid crystal displays, such as, for example, ferroelectric, can be improved with this invention by acquiring a wider field of view in the aligned state which exhibits C-axis symmetry.

The preferred embodiments of this invention have been illustrated and described above. Modifications and additional embodiments, however, will undoubtedly be apparent to those skilled in the art. Another possible embodiment, for example, would utilize the layered medium as one of the substrates in the display structure. The invention is applicable as well to color displays, in which color filters are associated with the arrays of electrodes in the display. Furthermore, equivalent elements may be substituted for those illustrated and described herein, parts or connections might be reversed or otherwise interchanged, and certain features of the invention may be utilized independently of other features. In addition, details of the liquid crystal display, such as active matrix circuitry, are not presented because such details are well known in the art of liquid crystal displays. Consequently, the exemplary embodiments should be considered illustrative, rather than inclusive, while the appended claims are more indicative of the full scope of the invention.

The teaching of the following documents, which are referred to herein, is incorporated by reference:

Gooch, et al., The Optical Properties of Twisted Nematic Liquid Crystal Structures with Twist Angles $\leq 90°$, Journal of Physics D, Volume 8, Page 1575 (1975)

Grinberg, et al., Transmission Characteristics of a Twisted Nematic Liquid-Crystal Layer, Journal of the Optical Society of America, Volume 66, Page 1003 (1976)

Kahn, The Molecular Physics of Liquid-Crystal Devices, Physics Today, Page 68 (May 1982).

Kaneko, Liquid-Crystal Matrix Displays, in Advances in Image Pickup and Display, Volume 4, Pages 2–86 (B. Kazan ed. 1981).

Penz, Viewing Characteristics of the Twisted Nematic Display, Proceeding of the S.I.D, Volume 19, Page 43 (1978).

Yeh, Optical Waves in Layered Media (Wiley 1988).

We claim:

1. A liquid crystal display, comprising:
   a polarizer layer;
   an analyzer layer;
   a liquid crystal layer disposed between the polarizer layer and the analyzer layer;
   a first electrode proximate to a first major surface of the liquid crystal layer;
   a second electrode proximate to a second major surface of the liquid crystal layer, the first and second electrodes being adapted to apply a voltage across the liquid crystal layer when the electrodes are connected to a source of electrical potential; and
   a multilayer thin film compensator disposed between the polarizer layer and the analyzer layer, including a first plurality of layers, each having a first refractive index and a first thickness, alternating with a second plurality of layers, each having a second refractive index and a second thickness, the values of the first and second refractive indices and thicknesses being such that the phase retardation of the multilayer is equal in magnitude but opposite in sign to the phase retardation of the liquid crystal layer in its homeotropically aligned state over a predetermined range of viewing angles.

2. The display of claim 1, wherein:
the liquid crystal layer has a thickness $d_L$ and a birefringence $\Delta n_L$;
the multilayer has a thickness $d_C$ and a birefringence $\Delta n_C$; and
$|\Delta n_L| d_L = |\Delta n_C| d_C$.

3. The display of claim 2, wherein:
the liquid crystal layer has an ordinary index of refraction $n_{oL}$ and an extraordinary index of refraction $n_{eL}$;
the multilayer has an ordinary index of refraction $n_{oC}$ and an extraordinary index of refraction $n_{eC}$;
$n_{eC} = n_{oL}$;
$n_{oC} = n_{eL}$; and
$d_L = d_C$.

4. The display of claim 2, wherein the equivalent refractive indices of the multilayer satisfy the relationships:

$$n_o^2 = \frac{d_1}{\Lambda} n_1^2 + \frac{d_2}{\Lambda} n_2^2$$

$$\frac{1}{n_e^2} = \frac{d_1}{\Lambda} \frac{1}{n_1^2} + \frac{d_2}{\Lambda} \frac{1}{n_2^2}$$

where $n_o$ is the equivalent ordinary refractive index of the multilayer, $n_e$ is the equivalent extraordinary refractive index of the multilayer, $n_1$ is the first refractive index, $n_2$ is the second refractive index, $d_1$ is the first thickness, $d_2$ is the second thickness, and $\Lambda = d_1 + d_2$ is the period of the multilayer.

5. A liquid crystal display of the type including a polarizer layer, an analyzer layer, a liquid crystal layer disposed between the polarizer layer and the analyzer layer, a first electrode proximate to a first major surface of the liquid crystal layer, and a second electrode proximate to a second major surface of the liquid crystal layer, the first and second electrodes being adapted to apply a voltage across the liquid crystal layer when the electrodes are connected to a source of electrical potential; the improvement comprising:
a multilayer thin film compensator disposed between the polarizer layer and the analyzer layer, including a first plurality of layers, each having a first refractive index and a first thickness, alternating with a second plurality of layers, each having a second refractive index and a second thickness, the values of the first and second refractive indices and thicknesses being such that the phase retardation of the multilayer is equal in magnitude but opposite in sign to the phase retardation of the liquid crystal layer in its homeotropically aligned state over a predetermined range of viewing angles.

6. The display of claim 5, wherein:
the liquid crystal layer has a thickness $d_L$ and a birefringence $\Delta n_L$;
the multilayer has a thickness $d_C$ and a birefringence $\Delta n_C$; and
$|\Delta n_L| d_L = |\Delta n_C| d_C$.

7. The display of claim 6, wherein:
the liquid crystal layer has an ordinary index of refraction $n_{oL}$ and an extraordinary index of refraction $n_{eL}$;
the multilayer has an ordinary index of refraction $n_{oC}$ and an extraordinary index of refraction $n_{eC}$;
$n_{eC} = n_{oL}$;
$n_{oC} = n_{eL}$; and
$d_L = d_C$.

8. The display of claim 6, wherein the equivalent refractive indices of the multilayer satisfy the relationships:

$$n_o^2 = \frac{d_1}{\Lambda} n_1^2 + \frac{d_2}{\Lambda} n_2^2$$

$$\frac{1}{n_e^2} = \frac{d_1}{\Lambda} \frac{1}{n_1^2} + \frac{d_2}{\Lambda} \frac{1}{n_2^2}$$

where $n_o$ is the equivalent ordinary refractive index of the multilayer, $n_e$ is the equivalent extraordinary refractive index of the multilayer, $n_1$ is the first refractive index, $n_2$ is the second refractive index, $d_1$ is the first thickness, $d_2$ is the second thickness, and $\Lambda = d_1 + d_2$ is the period of the multilayer.

9. A method of compensating for phase retardation in a liquid crystal display of the type including a polarizer layer, an analyzer layer, a liquid crystal layer disposed between the polarizer layer and the analyzer layer, a first electrode proximate to a first major surface of the liquid crystal layer, and a second electrode proximate to a second major surface of the liquid crystal layer, the first and second electrodes being adapted to apply a voltage across the liquid crystal layer when the electrodes are connected to a source of electrical potential, the method comprising the step of:
placing a multilayer thin film compensator between the polarizer layer and the analyzer layer, the multilayer including a first plurality of layers, each having a first refractive index and a first thickness, alternating with a second plurality of layers, each having a second refractive index and a second thickness, the values of the first and second refractive indices and thicknesses being such that the phase retardation of the multilayer is equal in magnitude but opposite in sign to the phase retardation of the liquid crystal layer in its homeotropically aligned state over a predetermined range of viewing angles.

10. The method of claim 9, wherein:
the liquid crystal layer has a thickness $d_L$ and a birefringence $\Delta n_L$;
the multilayer has a thickness $d_C$ and a birefringence $\Delta n_C$; and
$|\Delta n_L| d_L = |\Delta n_C| d_C$.

11. The display of claim 10, wherein:
the liquid crystal layer has an ordinary index of refraction $n_{oL}$ and an extraordinary index of refraction $n_{eL}$;
the multilayer has an ordinary index of refraction $n_{oC}$ and an extraordinary index of refraction $n_{eC}$;
$n_{eC} = n_{oL}$;
$n_{oC} = n_{eL}$; and
$d_L = d_C$.

12. The method of claim 10, wherein the values of the first and second refractive indices and thicknesses are further selected to satisfy the relationships:

$$n_o^2 = \frac{d_1}{\Lambda} n_1^2 + \frac{d_2}{\Lambda} n_2^2$$

$$\frac{1}{n_e^2} = \frac{d_1}{\Lambda} \frac{1}{n_1^2} + \frac{d_2}{\Lambda} \frac{1}{n_2^2}$$

where $n_o$ is the equivalent ordinary refractive index of the multilayer, $n_e$ is the equivalent extraordinary refractive index of the multilayer, $n_1$ is the first refractive index, $n_2$ is the second refractive index, $d_1$ is the first thickness, $d_2$ is the second thickness, and $\Lambda = d_1 + d_2$ is the period of the multilayer.

* * * * *